Patented May 15, 1934

UNITED STATES PATENT OFFICE 1,958,929

MANUFACTURE OF AGE RESISTING RUBBER PRODUCT

Robert L. Sibley, Nitro, W. Va., assignor to The Rubber Service Laboratories Co., Akron, Ohio, a corporation of Ohio No Drawing. Application May 21, 1929, Serial No. 364,951

19 Claims. (Cl. 18—50)

The present invention relates to the vulcanization of rubber by an improved process wherein there is employed, in addition to an accelerator and the ordinary compounding ingredients, a class of reaction products capable of imparting age resisting or anti-oxidant properties to the vulcanized rubber product.

More particularly, the present invention relates to the use of a reaction product of an aliphatic aldehyde and an aryl hydroxide as an anti-oxidant or age resisting compound whereby the period of use of the vulcanized rubber product with respect to aging and oxidation thereof is greatly increased.

As is well known to rubber chemists, the age resisting characteristics of a vulcanized rubber product can be readily ascertained by subjecting samples of the vulcanized product in a bomb to the action of oxygen under pressure and maintained for several hours at an elevated temperature. The samples so treated are then examined and tested and the results compared with similar results obtained by testing the unaged vulcanized stock. The deterioration in properties suffered as a result of the oxidation treatment is indicative of the result that would be normally expected from that particular stock during service. A test carried out in the manner described is known as the Bierer-Davis aging test and produces an effect on a vulcanized rubber stock comparable with that resulting from several years of natural aging of the rubber.

The invention will be readily understood from the following description and examples. One of the preferred types of compounds was prepared by combining substantially one molar portion of acetaldehyde (44 parts) and substantially two molar portions of phenol (188 parts) in the presence of a small portion of a condensing agent, for example 0.1 part by weight of hydrochloric acid. After the reaction was completed, a small quantity of ammonia was added to the reaction product to neutralize any residual acidity and then steam passed therethrough to remove any unreacted phenol or aldehyde. The product prepared as described possesses the structural formula

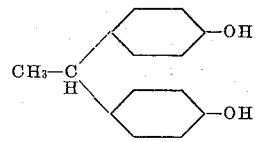

A sample of the reaction product thus obtained was then incorporated in the well known manner in a rubber stock comprising 100 parts of pale crepe rubber,
5 parts of zinc oxide,
3.5 parts of sulfur,
0.8 part of diphenyl-guanidine,
2.0 parts of the phenol-acetaldehyde product set forth.

This stock was then vulcanized by heating sheets of the stock in the usual manner for forty-five minutes at the temperature given by forty pounds of steam pressure per square inch, that is 287° F. Portions of the stock cured as described were artificially aged by heating samples of the said rubber stock in an oxygen bomb for eighteen hours at 75° C. and under an oxygen pressure of 400 pounds per square inch. The results obtained by testing the aged and unaged stocks are given in Table I.

Table I

| Time of cure | Hours aged | Modulus of elasticity in lbs/in² at elongations of— | | | Tensile at break in lbs/in² | Ultimate elongation |
|---|---|---|---|---|---|---|
| | | 300% | 500% | 700% | | |
| 45 mins. at 287° F | 0 | 154 | 438 | 1648 | 2690 | Percent 790 |
| Do | 18 | 117 | 402 | 1425 | 1920 | 755 |

It is apparent from the results set forth that the stock has resisted oxidation very satisfactorily.

Another of the preferred type of compounds comprising the reaction product of substantially two molar portions of beta-naphthol and substantially one molar portion of acetaldehyde was prepared in the following manner:

Substantially two molar portions of beta-naphthol (288 parts) were dissolved in approximately 700 parts of a suitable solvent, in this case ethyl alcohol, and substantially one-third molar portion of paraldehyde (44 parts) together with a slight excess of hydrochloric acid over that required to convert the paraldehyde to acetaldehyde were added thereto at approximately room temperature. After the reaction was completed, weak caustic soda solution was added to the reaction mixture in quantity sufficient to neutralize all residual acidity and the solid product formed was filtered from the liquid, washed with water and recrystallized from an organic solvent, for example ethyl alcohol. A sample of the material thus formed was incorporated in a rubber stock comprising 100 parts of pale crepe rubber,
   5 parts of zinc oxide,
   3.5 parts of sulfur,
   0.8 parts of diphenyl-guanidine,
   2 parts of the beta-naphthol acetaldehyde product.

After vulcanizing by heating sheets of the above stock in the usual manner for forty-five minutes at the temperature of forty pounds of steam pressure per square inch, portions of the stock as set forth were aged artificially by heating in an oxygen bomb for eighteen hours at 75° C. and under an oxygen pressure of 400 pounds per square inch. The results obtained by testing the aged and unaged stocks showed that this material possessed valuable anti-oxidant properties when incorporated in a rubber stock.

A reaction product of the type just described has also been prepared by heating substantially 70 parts of beta-naphthol with substantially 30 parts of paraldehyde and substantially 150 parts of a solvent, in this case acetic acid, in the presence of a condensing agent, for example 10 parts of hydrochloric acid, until the reaction had ceased.

Another example of the preferred class of compounds comprises a reaction product of substantially equi-molar portions of phenol and butylaldehyde, wherein substantially one molar portion of phenol (94 parts) and substantially one molar portion of butylaldehyde (72 parts) were reacted in the presence of substantially 0.5 parts of hydrochloric acid as a condensing agent. After the reaction was completed, a sufficient quantity of ammonia was added to the reaction product to neutralize any residual acidity or any acidity developed by the reaction, whereupon steam was passed therethrough to eliminate any unreacted aldehyde or phenol. The reaction product thus produced was incorporated in a rubber mix comprising 100 parts of pale crepe rubber,
   5 parts of zinc oxide,
   3.5 parts of sulfur,
   0.8 parts of diphenyl-guanidine,
   2.0 parts of the phenol-butylaldehyde product.

The compounded stock was then vulcanized by heating sheets of the stock in the usual manner for forty-five minutes at forty pounds of steam pressure per square inch. Samples of the cured rubber stock were then artificially aged by heating samples of the said vulcanized stock in an oxygen bomb for eighteen hours at 75° C. and under an oxygen pressure of 400 pounds per square inch. The tensile data obtained by testing the aged and unaged stocks are given in Table II.

Table II

| Time of cure | Hours aged | Modulus of elasticity in lbs/in² at elongations of— | | | Tensile at break in lbs/in² | Ultimate elongation |
| --- | --- | --- | --- | --- | --- | --- |
| | | 300% | 500% | 700% | | |
| 45 mins. at 287° F | 0 | 202 | 712 | 2545 | 3295 | Percent 745 |
| Do | 18 | 162 | 627 | 2150 | 2240 | 710 |

Another example of the type of compounds disclosed in the present specification comprises the reaction product formed by combining substantially equi-molar portions of butylaldehyde and beta-naphthol. In producing this product substantially one-half a molar portion of beta-naphthol (72 parts) was dissolved in substantially 150 parts of acetic acid and substantially one-half a molar portion of n-butylaldehyde (36 parts) added thereto in the presence of substantially 10 parts of a condensing agent, for example hydrochloric acid. The oily reaction product so obtained was washed with a hot alkaline solution such, for example, as sodium carbonate solution, and finally with boiling water. The reaction product thus obtained was incorporated in the well known manner in a rubber stock comprising 100 parts of pale crepe rubber,
   5 parts of zinc oxide,
   3.5 parts of sulfur,
   0.8 parts of diphenyl-guanidine,
   2.0 parts of the butylaldehyde-beta-naphthol product.

The compounded stock was then cured by heating sheets of the stock for forty-five minutes at forty pounds steam pressure per square inch. Samples of the rubber stock cured as described where then artificially aged by heating in an oxygen bomb for eighteen hours at 75° C. and under an oxygen pressure of 400 pounds per square inch. The results obtained by testing the unaged and aged stocks are given in Table III.

Table III

| Time of cure | Hours aged | Modulus of elasticity in lbs/in² at elongations of— | | | Tensile at break in lbs/in² | Ultimate elongation |
| --- | --- | --- | --- | --- | --- | --- |
| | | 300% | 500% | 700% | | |
| 45 mins. at 287° F | 0 | 213 | 593 | 2388 | 3270 | Percent 765 |
| Do | 18 | 212 | 602 | 2355 | 2355 | 700 |

The stock is shown to have retained to a great extent the properties desired even after exposure to the very severe aging test set forth.

Other methods of preparing a reaction product of substantially equi-molar portions of n-butylaldehyde and beta-naphthol may be employed. Thus, substantially one molar portion of beta-naphthol (144 parts) and substantially one molar portion of n-butylaldehyde (72 parts) where heated to substantially 60 to 100° C. in the presence of substantially 0.5 parts of a condensing agent, for example hydrochloric acid, until reaction ceased. Ammonia was added to the reaction product to neutralize any residual acidity therein and then steam was passed therethrough to remove any unreacted beta-naphthol or butylaldehyde.

The anti-oxidants hereinbefore disclosed, that is the phenol-acetaldehyde reaction product, the beta-naphthol-acetaldehyde reaction product, the phenol-butylaldehyde reaction product, the beta-naphthol-butylaldehyde reaction product, were also incorporated in a tread stock comprising 100 parts of smoked sheet rubber,
   40 parts of carbon black,
   10 parts of zinc oxide,
   2 parts of a blended mineral oil and rosin,
   3.25 parts of sulfur,
   1.0 part of diphenyl-quanidine,
   1.0 part of anti-oxidant.

After vulcanizing by heating sheets of the stock in the usual manner for sixty minutes at the temperature of forty pounds of steam pressure per square inch, that is 287° F., portions of the stock cured as described were aged by heating samples of the said rubber stocks in an oxygen bomb for twenty-four hours at 70° C. and under an oxygen pressure of 300 pounds per square inch.

On testing the aged and unaged stocks, the aged stocks were found to retain to a large extent their original unaged characteristics.

As a further method of practicing the present invention, the reaction product of pyrogallol and formaldehyde was employed as an anti-oxidant. This anti-oxidant was made according to the method of Caro, given in Berichte der deutschen chemischen Gesellschaft, volume 25, page 947, wherein substantially two molar portions of pyrogallol are condensed with substantially one molar portion of formaldehyde solution, said condensation taking place in a weak hydrochloric acid solution. The product prepared as described possesses the formula

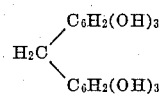

The purified material thus formed was incorporated in a rubber stock comprising 100 parts of pale crepe rubber,
5 parts of zinc oxide,
3.5 parts of sulfur,
0.8 part of diphenyl-guanidine,
2.0 parts of anti-oxidant.

After vulcanizing by heating in a press in the well known manner for forty-five minutes at the temperature given by forty pounds of steam pressure per square inch, portions of the stock were aged in the manner previously described by heating in an oxygen bomb for eighteen hours at a temperature of 75° C. and under a pressure of 400 pounds of oxygen per square inch. The tensile data obtained for the aged and unaged stocks follow:

*Table IV*

| Time of cure | Hours aged | Modulus of elasticity in lbs/in² at elongations of— | | | Tensile at break in lbs/in² | Ultimate elongation |
|---|---|---|---|---|---|---|
| | | 300% | 500% | 700% | | |
| | | | | | | *Percent* |
| 45 mins. at 287° F | 0 | 174 | 390 | 1343 | 2330 | 805 |
| Do | 18 | 146 | 333 | 1085 | 1810 | 795 |

The stock after aging is shown to have retained to a large degree the original characteristics of the vulcanizate.

From the data hereinbefore set forth it is seen that the preferred class of compounds constitute a desirable group of anti-oxidant or anti-aging materials for use in rubber goods. In no case did the rubber compound melt in the bomb to a shapeless mass during the artificial aging as would have been the case if no anti-oxidant was employed. The condensation product of other phenols and aliphatic aldehydes than those hereinbefore described may be employed as anti-oxidants. Thus, I may employ as an anti-oxidant the condensation product of heptaldehyde, propionic aldehyde, aldol, acrolein and the like with phenol, hydroquinone, resorcinol, alpha and beta naphthol and analogous equivalent compounds.

By the term phenol as employed in the present specification is meant an aromatic hydrocarbon wherein hydrogen atoms only are substituted by one or more hydroxyl groups.

In all the examples hereinbefore cited diphenyl-guanidine was employed as the accelerator because it is known to produce a vulcanized rubber stock possessing poor aging qualities and, therefore, will not in any way mask the effect of the anti-oxidant employed.

The various examples hereinbefore set forth in detail are to be understood as illustrative only and not at all limitative of the scope of the invention. This invention is limited solely by the claims attached hereto as a part of this specification.

What is claimed is:

1. The process of manufacturing an age resisting vulcanized rubber product which comprises heating rubber and sulfur in the presence of less than 5% of an anti-oxidant comprising the reaction product of a phenol containing a single benzene nucleus and an aliphatic aldehyde.

2. The process of manufacturing an age resisting vulcanized rubber product which comprises curing a rubber composition of vulcanization characteristics in the presence of an anti-oxidant comprising the reaction product of a phenol containing a single benzene nucleus and acetaldehyde.

3. The process of manufacturing an age resisting vulcanized rubber product which comprises curing a rubber composition of vulcanization characteristics in the presence of an anti-oxidant comprising the reaction product of phenol and acetaldehyde.

4. The process of manufacturing an age resisting vulcanized rubber product which comprises curing a rubber composition of vulcanization characteristics in the presence of an anti-oxidant comprising the reaction product of substantially two molar portions of phenol and substantially one molar portion of acetaldehyde.

5. The process of manufacturing an age resisting vulcanized rubber product which comprises curing a rubber composition of vulcanization characteristics in the presence of an anti-oxidant comprising the reaction product of a phenol containing a single benzene nucleus and an aliphatic aldehyde containing more than one but less than five carbon atoms.

6. The process of manufacturing an age resisting vulcanized rubber product which comprises curing a rubber composition of vulcanization characteristics in the presence of an anti-oxidant comprising the reaction product of phenol and an aliphatic aldehyde containing more than one but less than five carbon atoms.

7. A vulcanized rubber product possessing age resisting characteristics comprising the vulcanization product of a rubber stock containing prior to the vulcanization of said stock rubber, sulfur and less than 5% of an anti-oxidant comprising the reaction product of a phenol containing a single benzene nucleus and an aliphatic aldehyde.

8. A vulcanized rubber product possessing age resisting characteristics comprising the vulcanization product of a rubber stock containing prior to the vulcanization of said stock an anti-oxidant comprising the reaction product of a phenol containing a single benzene nucleus and acetaldehyde.

9. A vulcanized rubber product possessing age resisting characteristics comprising the vulcanization product of a rubber stock containing prior to the vulcanization of said stock an anti-oxidant comprising the reaction product of phenol and acetaldehyde.

10. A vulcanized rubber product possessing age resisting characteristics comprising the vulcanization product of a rubber stock containing prior to the vulcanization of said stock an anti-oxidant comprising the reaction product of a phenol containing a single benzene nucleus and aliphatic aldehyde containing more than one but less than five carbon atoms.

11. A vulcanized rubber product possessing age resisting characteristics comprising the vulcanization product of a rubber stock containing prior to the vulcanization of said stock an anti-oxidant comprising the reaction product of phenol and an aliphatic aldehyde containing more than one but less than five carbon atoms.

12. A vulcanized rubber product possessing age resisting characteristics comprising the vulcanization product of a rubber stock containing prior to the vulcanization of said stock an anti-oxidant comprising the reaction product of substantially two molar portions of phenol and substantially one molar portion of acetaldehyde.

13. A method of retarding the deterioration of rubber which comprises treating rubber with ethylidene di-phenol.

14. A method of retarding the deterioration of rubber which comprises treating rubber with an alkylidene phenol produced by condensation in the presence of an acid.

15. The process of increasing the resistance of rubber to deterioration due to aging which comprises incorporating with the rubber p-p'-dihydroxy-diphenyl-methyl-methane, and thereafter vulcanizing.

16. The process of manufacturing an age resisting vulcanized rubber product which comprises heating rubber and sulfur in the presence of less than 5% of an antioxidant comprising a symmetrical hydroxy di-phenyl alkylidene compound.

17. The process of manufacturing an age resisting vulcanized rubber product which comprises heating rubber and sulfur in the presence of less than 5% of an antioxidant possessing the structural formula

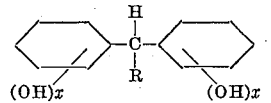

where R is one of a group consisting in hydrogen and an alkyl radical, and $x$ is a whole number less than four.

18. A vulcanized rubber product possessing age resisting characteristics comprising the vulcanization product of a rubber stock containing prior to the vulcanization of said stock rubber, sulfur and less than 5% of an antioxidant comprising a symmetrical hydroxy di-phenyl alkylidene compound.

19. A vulcanized rubber product possessing age resisting characteristics comprising the vulcanization product of a rubber stock containing prior to the vulcanization of said stock rubber, sulfur and less than 5% of an antioxidant possessing the structural formula

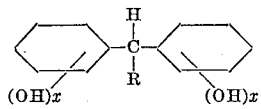

where R is one of a group consisting in hydrogen and an alkyl radical, and $x$ is a whole number less than four.

ROBERT L. SIBLEY.